(12) United States Patent
Rao et al.

(10) Patent No.: US 11,729,274 B2
(45) Date of Patent: Aug. 15, 2023

(54) CUSTOMIZED USER SESSION AT SHARED DEVICE

(71) Applicant: Microsoft Technology Licensing, LLC

(72) Inventors: Sandhya Rajendra Rao, Bellevue, WA (US); Kruthika Ponnusamy, Redmond, WA (US); Ashish Mehta, Redmond, WA (US); Daniel James Buchner, Woodinville, WA (US); Viney Anand Ugave, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 2 days.

(21) Appl. No.: 17/573,433

(22) Filed: Jan. 11, 2022

(65) Prior Publication Data
US 2023/0224373 A1 Jul. 13, 2023

(51) Int. Cl.
*G06F 15/16* (2006.01)
*H04L 67/306* (2022.01)

(52) U.S. Cl.
CPC ................. *H04L 67/306* (2013.01)

(58) Field of Classification Search
CPC .................................................. H04L 67/306
USPC .......................................................... 709/206
See application file for complete search history.

(56) References Cited

U.S. PATENT DOCUMENTS

| 10,367,687 B1 * | 7/2019 | Söderlind | ........... H04L 65/1059 |
| 10,587,616 B2 | 3/2020 | Lewis et al. | |
| 2004/0205157 A1 | 10/2004 | Bibelnieks et al. | |
| 2008/0209050 A1 | 8/2008 | Li | |
| 2008/0222546 A1 * | 9/2008 | Mudd | ................. H04N 21/482 715/764 |
| 2013/0097626 A1 | 4/2013 | Rajagopal et al. | |
| 2013/0346494 A1 | 12/2013 | Nakfour | |

(Continued)

FOREIGN PATENT DOCUMENTS

WO 2020091980 A1 5/2020

OTHER PUBLICATIONS

"AirPlay Discovery in Apple Devices", Retrieved from: https://support.apple.com/en-in/guide/deployment-reference-ios/apd19d206cc7/web, Dec. 14, 2020, 2 Pages.

(Continued)

*Primary Examiner* — Alan S Chou
(74) *Attorney, Agent, or Firm* — NovoTechIP International PLLC

(57) ABSTRACT

A system, which includes a first device associated with a user, a second device configured to establish a user session and a server, performs storing a default user session setting associated with the user, the default user session setting defining a default user access privilege to functionality or content; determining that the first device is proximate to the second device; receiving a second user input requesting to modify the default user session setting, the second user input including modification data defining a restrictive modification to the default user session setting; modifying, at the server, the default user session setting based on the modification data to create a customized user session setting defining a customized user access privilege to the functionality or content available via the system; and establishing, at the second device, the customized user session for the user based on the customized user setting received from the server.

20 Claims, 8 Drawing Sheets

(56) References Cited

U.S. PATENT DOCUMENTS

| | | | |
|---|---|---|---|
| 2016/0105472 A1 | 4/2016 | Chitroda et al. | |
| 2016/0119438 A1 | 4/2016 | Abramson et al. | |
| 2018/0337967 A1* | 11/2018 | Ritchie | H04L 67/55 |
| 2021/0127436 A1* | 4/2021 | Smets | H04W 76/11 |

OTHER PUBLICATIONS

"AirPlay Security in Apple Devices", Retrieved from: https://support.apple.com/en-in/guide/deployment-reference-ios/apd40ab73b35/web, Dec. 14, 2020, 1 Page.

"Guest Mode", Retrieved from: https://developers.google.com/cast/docs/guest_mode, Jun. 2, 2021, 4 Pages.

Páez, et al., "An Architecture for Biometric Electronic Identification Document System Based on Blockchain", In the Journal of Future Internet, Jan. 11, 2020, 19 Pages.

Racoma, J.A., "Chromecast to use Ultrasonic Tones for Authentication: A New Trend in Wireless Communication?", Retrieved from: https://www.androidauthority.com/chromecast-use-ultrasonic-tones-authentication-newtrend-wireless-communication-398620/, Jun. 27, 2014, 3 Pages.

Sabadello, et al., "Introduction to DID Auth", In a White Paper from Rebooting the Web of Trust VI, Jul. 26, 2018, pp. 1-31.

"Calls and Devices", Retrieved From: https://web.archive.org/web/20220611181748/https://support.microsoft.com/en-us/office/calls-and-devices-4d96653e-6176-4978-98ab-2c19df137e43, Jun. 11, 2022, 1 Page.

"Getting Started with Zoom Device Management", Retrieved From: https://support.zoom.us/hc/en-us/articles/360032285752, Dec. 15, 2021, 2 Pages.

"Getting Started with Zoom Rooms Appliances", Retrieved From: https://support.zoom.us/hc/en-us/articles/360039376751, Mar. 10, 2022, 2 Pages.

"Hot Desking", Retrieved From: https://web.archive.org/web/20210408155146/https://www.ringcentral.com/office/features/hot-desking/overview.html, Apr. 8, 2021, 3 Pages.

"Prepare Offices for Hybrid Work with New Experiences on Microsoft Teams Rooms and Teams Devices", Retrieved From: https://techcommunity.microsoft.com/t5/microsoft-teams-blog/prepare-offices-for-hybrid-work-with-new-experiences-on/ba-p/2709599, Sep. 9, 2021, 9 Pages.

"Using Hot Desking for Phones", Retrieved From: https://support.zoom.us/hc/en-us/articles/360043841032-Using-hot-desking-for-phones, Jun. 9, 2022, 3 Pages.

"What's New in Microsoft Teams", Retrieved From: https://techcommunity.microsoft.com/t5/microsoft-teams-blog/what-s-new-in-microsoft-teams-december-2021/ba-p/3050099#:~:text=Hot%20desking%20on%20Microsoft%20Teams, access%20their%20personalized%20Teams%20experience, Jan. 3, 2022, 13 Pages.

Herskowitz, Nicole, "Brace Yourselves: Hybrid Work is Hard. Here's How Microsoft Teams and Office 365 can Help", Retrieved From: https://www.microsoft.com/en-us/microsoft-365/blog/2021/09/09/brace-yourselves-hybrid-work-is-hard-heres-how-microsoft-teams-and-office-365-can-help/, Sep. 9, 2021, 10 Pages.

"International Search Report and Written Opinion Issued in PCT Application No. PCT/US22/048127", dated Feb. 6, 2023, 11 Pages.

* cited by examiner

DEFAULT USER SESSION SETTING — 200

☐ AUTOMATIC LOGOUT

AUTOMATIC LOGOUT AFTER ____ MINUTES OF INACTIVITY

COMMUNICATION CONTROL

☒ MAKE OR RECEVIE EXTERNAL CALLS

☒ MAKE OR RECEVIE VIDEO CALLS

FILE ACESS CONTROL

☒ READ FILES

☒ EDIT FILES

☒ DELETE FILES

☒ CREATE NEW FILE

BROSWER CONTROL

☒ BOOKMARK SYNC

☒ BROSWER HISTORY SYNC

☐ CLEAR CACHE UPON LOGOUT

FIG. 2

CUSTOMIZED USER SESSION AT SHARED DEVICE

BACKGROUND

With the recent advancements of communications and IT technologies, more and more workers can perform tasks virtually everywhere. Nowadays, many workers work remotely at home or any desired location, and commute to workspaces only when it is necessary. Hence, it became less important for workers to have physical offices and designated work-related devices (e.g., a computer, monitor, telephone, etc.), and many organizations have implemented workspace hoteling services which provide a temporary office space or shared work-related devices (e.g., a shared computer, monitor, telephone, printer, etc.) at designated location or locations. When a user walks into such workspace hoteling service locations, the user is provided with or allowed to select a shared device (e.g., a desktop, laptop, etc.). The user may then provide his or her user credentials (e.g., a login ID, password, PIN, etc.) to login to the shared device. Based on the user credential, a backend system (e.g., a server, storage, etc.) may retrieve and apply a user-specific setting to a user session on the shared device.

In certain circumstances, the user may need to modify the user-specific setting applied to the current user session. For example, while the user is temporarily away from the shared device, other people may use the shared device to access functions and resources available to the user. Hence, the user may need to modify the user-specific settings for the current user session to prevent unauthorized access to the functions and resources available to the user via the shared device. Such modification, however, may require the user to contact a network administrator to have the user-specific setting temporarily modified for the current user session, which is burdensome and time consuming. As such, there still remain significant areas for new and improved implementations for modifying a user-specific setting for a user session on a shared device.

SUMMARY

In an implementation, a system includes a first device associated with a user; a second device configured to establish a user session; and a server in communication with the second device and configured to control the second device to establish the user session. At least one of the first device, the second device and the server includes a processor and a computer-readable medium in communication with the processor and storing instructions that, when executed by the processor, cause the system to perform storing, at a data storage, a default user session setting associated with the user, the default user session setting defining a default user access privilege to functionality or content available via the system; receiving a first user input selecting the second device for establishing the user session; determining that the first device is proximate to the second device; authenticating the user based on authentication data provided from the first device; receiving a second user input requesting to modify the default user session setting, the second user input including modification data defining a restrictive modification to the default user session setting; modifying, at the server, the default user session setting based on the modification data to create a customized user session setting defining a customized user access privilege to the functionality or content available via the system, wherein the customized user access privilege is more restrictive than the default user access privilege; establishing, at the second device, the customized user session for the user based on the customized user setting received from the server; and notifying the user that the customized user session has been established at the second device.

In another implementation, a non-transitory computer-readable medium includes instructions that, when executed by a processor, cause the processor to control a system to perform functions. The system includes (1) a first device associated with a user, (2) a second device configured to establish a user session, and (3) a server in communication with the second device and configured to control the second device to establish the user session. The functions performed by the system include storing, at a data storage, a default user session setting associated with the user, the default user session setting defining a default user access privilege to functionality or content available via the system; receiving a first user input selecting the second device for establishing the user session; determining that the first device is proximate to the second device; authenticating the user based on authentication data provided from the first device; receiving a second user input requesting to modify the default user session setting, the second user input including modification data defining a restrictive modification to the default user session setting; modifying, at the server, the default user session setting based on the modification data to create a customized user session setting defining a customized user access privilege to the functionality or content available via the system, wherein the customized user access privilege is more restrictive than the default user access privilege; establishing, at the second device, the customized user session for the user based on the customized user setting received from the server; and notifying the user that the customized user session has been established at the second device.

In another implementation, a method performed by a system, which includes (1) a first device associated with a user, (2) a second device configured to establish a user session, and (3) a server in communication with the second device and configured to control the second device to establish the user session, includes storing, at a data storage, a default user session setting associated with the user, the default user session setting defining a default user access privilege to functionality or content available via the system; receiving a first user input selecting the second device for establishing the user session; determining that the first device is proximate to the second device; authenticating the user based on authentication data provided from the first device; receiving a second user input requesting to modify the default user session setting, the second user input including modification data defining a restrictive modification to the default user session setting; modifying, at the server, the default user session setting based on the modification data to create a customized user session setting defining a customized user access privilege to the functionality or content available via the system, wherein the customized user access privilege is more restrictive than the default user access privilege; establishing, at the second device, the customized user session for the user based on the customized user setting received from the server; and notifying the user that the customized user session has been established at the second device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 2 illustrates an example default user session setting.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

This description is directed to allowing a user to easily modify a setting for conducting a user session. A user may sometimes need to use a shared device (e.g., a shared desktop PC available at a workspace hoteling facility) to conduct a user session (e.g., creating a document, modifying a document stored in a cloud storage, participate a videoconference, etc.). In such situations, the user session is conducted based on a default user session setting, which is typically set up based on the most common usage scenarios, for example, a scenario in which a user session is conducted using a device associated with the user and located at the user's home or office. In such scenarios, a user session may not need to be conducted with strict security protections. However, when the user needs to conduct a user session using a shared computer at less secure environments (e.g., a shared office, coffee shop, airport, etc.), the default user session setting might not be sufficient to protect the user session from unauthorized accesses. To solve these technical problems, this disclosure provides technical solutions allowing the user to modify the default user session setting whenever the user wants or needs. When the user conducts a user session using a shared computer, the user may use his or her mobile device to provide a user input modifying the default user session setting. The user device or shared device may then communicate with a server to temporarily modify the default user session setting for the particular user session, for example, to deactivate document deleting or editing functions, restrict access to a designated storage location, disable accepting personal calls or emails, etc. Hence, even if the shared device is accessed by unauthorized parties, functions and resources available to the user are protected from such unauthorized accesses.

Figure 1:
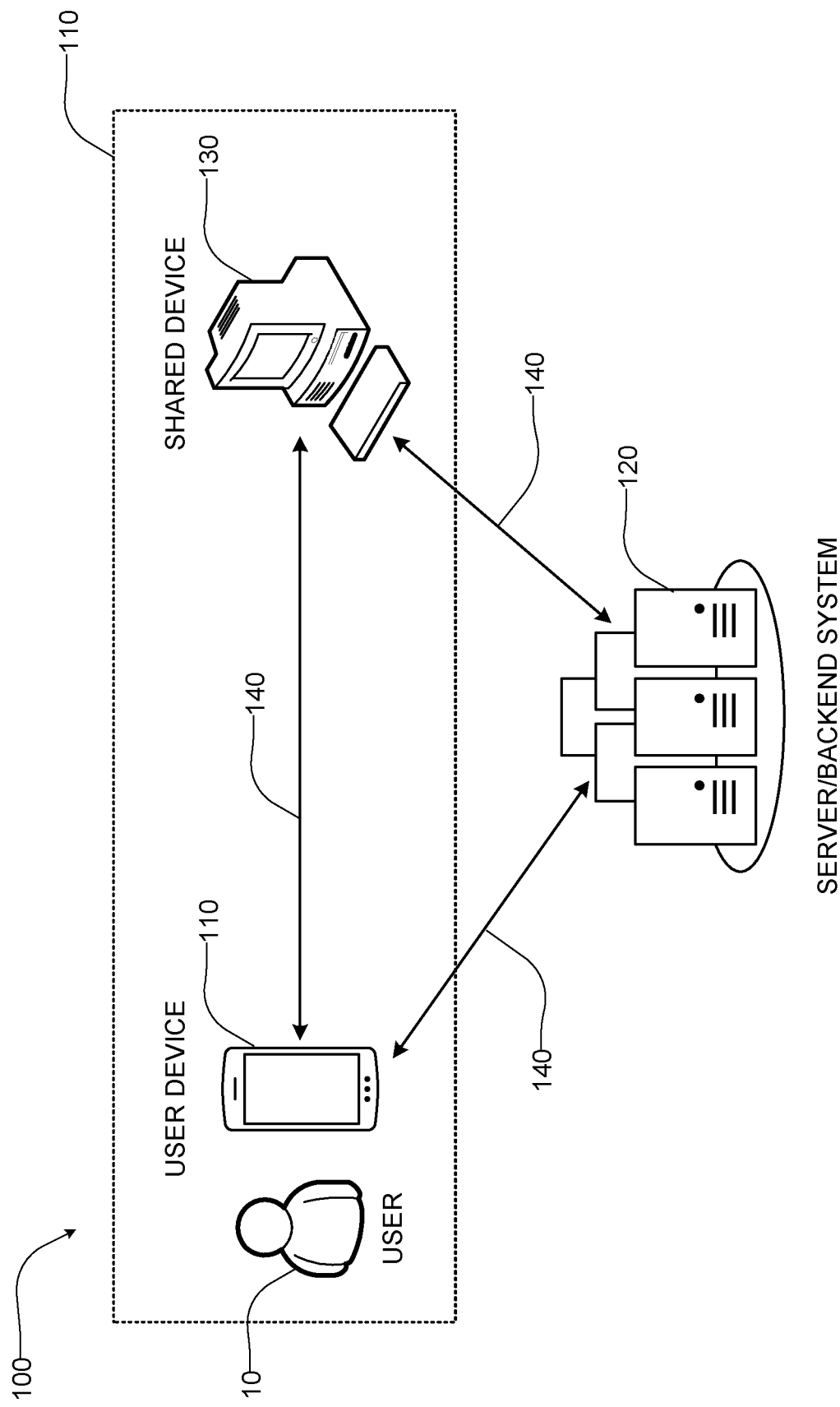
FIG. 1 illustrates an example system 100 for conducting a user session on a shared device and modifying a user session setting applied to the user session.

With this overview, attention is now turned to the figures to described various implementations of the presenting teachings. FIG. 1 illustrates an example system 100 for allowing a user to carrying out a user session on a shared device and modify a user session setting applied to the user session. The system 100 may include a user device 110, a server/backend system 120, a shared device 130, and/or the like, each of which may be connected to some of or all the others via suitable communication link or links 140.

The user device 110 may be a mobile device, such as a smart phone, laptop computer, tablet computer, wearable computer, as well as any variation or combination thereof. The user device 110 may be associated with and configured for an exclusive use by a particular user 10. The user device 110 may operate remotely from and communicate with the server 120 by way of data and information exchanged over the link 140. The user device 110 may be configured to conduct some of the functions for allowing the user 10 to conduct a user session using the shared device 130 and customize a user session setting for the user session. The user device 110 may include a display (not shown), which may display a graphical user interface (GUI) for the local service or other software tools. The local service may be implemented as a locally installed and executed application, streamed application, mobile application, or any combination or variation thereof. Alternatively, the local service may be implemented as part of an operating system (OS), such as Apple™ iOS™, Google™ Android™, Google™ Chrome OS™, etc. The local service may be implemented as a standalone application or may be distributed across multiple applications.

The server/backend system 120 (hereinafter "server 120") is representative of any physical or virtual computing system, device, or collection thereof, such as, a web server, rack server, blade server, virtual machine server, or tower server, as well as any other type of computing system, which may, in some scenarios, be implemented in a data center, a virtual data center, or some other suitable facility. The server 120 may host, be integrated with, or be in communication with various data sources and processing resources, such as, databases, data processing devices, data storages, search engines, etc. The server 120 may host a user session support service configured to provide functions and resources for the user 10 to conduct a user session using the shared device 130. The user session support service may be any software application, module, component, or collection thereof. The server 120 may store or access a default user session setting, for example, an automatic logout setting, communication control setting, file access control setting, etc. When the user 10 is authenticated, the server 120 may control the shared device 130 to establish a user session based on the default user session setting associated with the user 10. In an implementation, the user session support service may be a remote desktop service which allows the user's desktop environment to be run on the shared device 130.

The shared device 130 may be configured to perform some of the functions for allowing the user 10 to conduct a user session. The shared device 130 may not be associated with any particular user and may be configured to be usable for a user session by any authenticated user with appropriate access privileges. The shared device 130 may be a physical or virtual computing system, device, or collection thereof, such as a desktop computer, laptop computer, hybrid computer, tablet computer, gaming machine, smart television, entertainment device, Internet appliance, virtual machine, as well as any variation or combination thereof. The shared device 130 may operate remotely from the server 120, and hence may communicate with each other by way of data and information exchanged over a suitable communication network or networks 140.

The shared device 130 may host a user session service, which is representative of any software application, module, component, or collection thereof, capable of allowing the user 10 to conduct a user session. The user session service may operate independently from or as part of a software tool for allowing the user 10 to confirm the user's proximity, conduct a user session, customize the default user session setting, etc. The shared device 130 may include or be connected to a display, which may display a graphical user interface (GUI) for the user session service or the software tool. The user session service may be implemented as a locally installed and executed application, streamed application, mobile application, or any combination or variation thereof, which may be configured to conduct operations or functions related to allowing the user to conduct a user session and customize a user session setting. Alternatively, the user session service may be implemented as part of an operating system (OS), such as Microsoft™ Windows™, Apple™ iOS™, Linux™, Google™ Chrome OS™, etc. The user session service may be implemented as a standalone application or may be distributed across multiple applications.

The server 120 may determine, based on user information, for example, an access privilege associated with the user 10, etc., a default user session setting, which may be automatically applied to a user session regardless of which device is being used to establish the user session. The default user session setting may define how a user session should be implemented, for example, an automatic logout setting (e.g., whether a user should be automatically logged out from the current user session if an inactivity is detected for a predetermined or user-defined time period, etc.), communication control setting (e.g., whether a user should be able to make or receive external calls or video calls, etc. during the current user session), file access control setting (e.g., whether a user should be able to read, edit, delete or create a file during the current user session, etc.), browser control setting (e.g., whether a bookmark or browsing history should be synced for the current user session, whether the browser cache should be cleared out upon logging out from the current user session, etc.), and/or the like.

Alternatively, the default user session setting may be set by the user 10 based on the user preferences. For example, in a situation where the user 10 mostly works at home or a designated office space where security and privacy are maintained, the user 10 may set the default user session setting to be more convenient and less restrictive such that the user 10 can more freely utilize and access the functions and contents available through the system 100. For example, as shown in FIG. 2, which illustrates an example graphical user interface (GUI) 200 rendered on the user device 100 for displaying an example default user session setting, the user 10 may set the default user session setting such that the user is not automatically logged out regardless of how long an inactivity has lasted, can make or receive external calls and video calls, can read, edit, delete and create a file, perform web browsing with the browser bookmark and browsing history synced, and/or the like. The user 10 may also set the default user session such that the web browser's cache is not cleared upon terminating the current user session such that browsing data gathered from the current user session is available for a next user session.

Such default user session setting, however, may pose serious security problems when a third-party user takes control over a user session. For example, while the user 10 is conducting a remote desk session using a shared computer available at a shared office, hotel, coffee shop, etc., a third-party user may take over the user session while the user is temporarily unavailable from a space where the shared device is located. During such absence, the third-party user may access files and then edit or delete such files without authorization from the user 10. Hence, when the user needs to conduct a user session using a shared device away from locations where privacy and security can be maintained, the default user session setting may need to be modified to be more restrictive to preempt and deter unauthorized accesses to user sessions.

To avoid such security issues, the user 10 may notify, to the system 100, which shared device is used for a user session, and then the system 100 may determine whether the user is physically proximate to the shared device selected by the user. Once the user's selection of and physical proximity to the shared device is confirmed, the user 10 may provide, to the system 100, authentication data and customized user session setting data. Upon authenticating the user 10, the system 100 may modify or customize, based on the customized user session setting data provided by the user, the default user session setting to create a customized user session setting, which may be more restrictive than the default user session setting. The system 100 may then establish, at the shared device 130, a customized user session for the user 10 based on the customized user session setting. Upon establishing the customed user session, the system 100 may provide, to the user 10, a notification that the customized user session has been established at the shared device 130. This allows to ensure that the functions and contents accessible via the session is restricted and protected from unauthorized accesses to and controls over the shared device 130, thereby providing technical solutions to the technical problem that a user session conducted using a shared device is vulnerable to unauthorized access to and control over the functions and contents available through the system 100.

Figure 3:
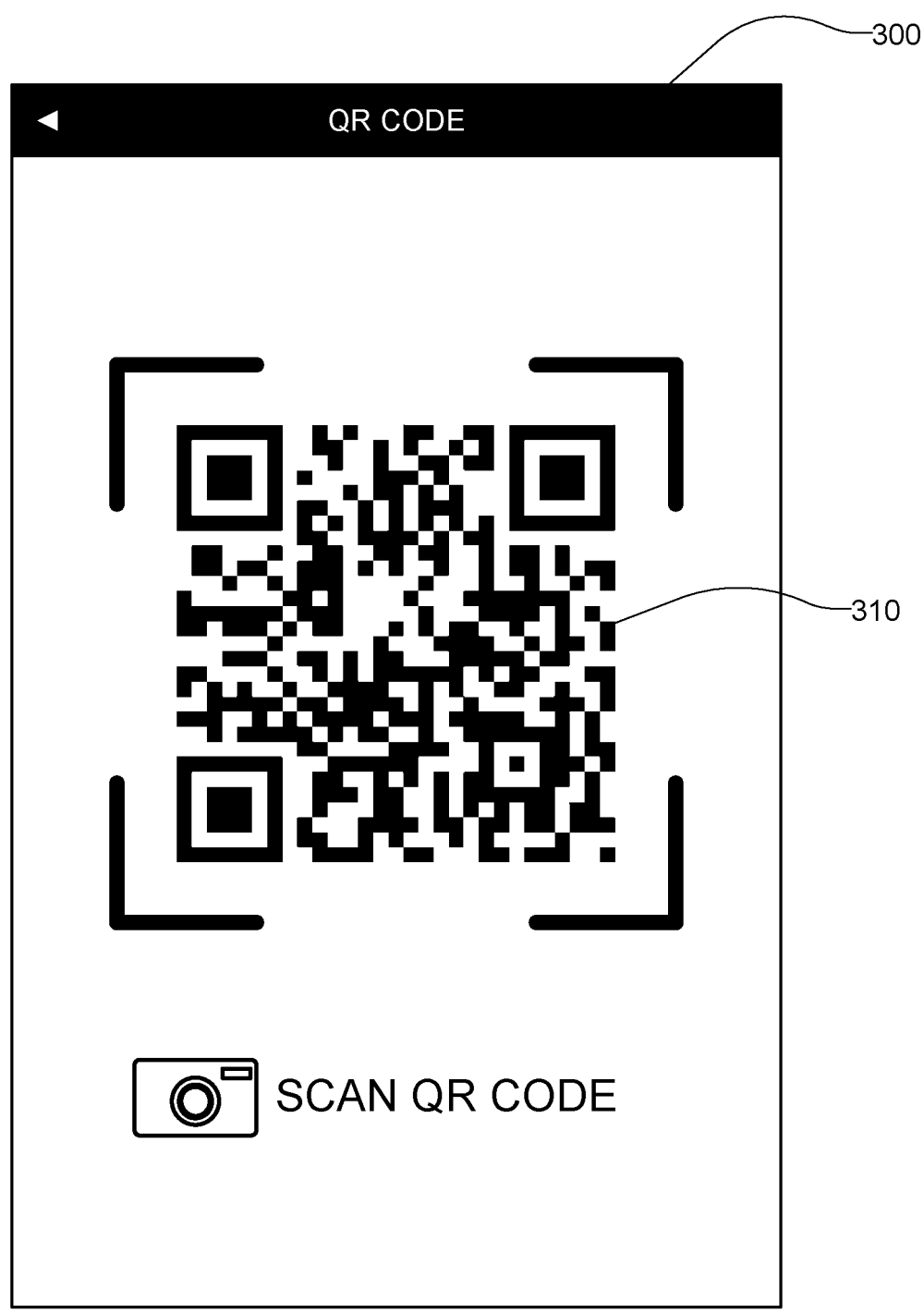
FIG. 3 illustrates an example graphical user interface (GUI) displayed on a user device for scanning a QR code displayed on a shared device.

To select the shared device 130 for a user session, the user 10 may approach the shared device 130, which may be configured to display a QR code on a display thereof when interacted by the user for initiating the user session. The user 10 may then use the user device 110 to capture the QR code. FIG. 3 illustrates an example GUI 300 rendered and displayed on the user device 110 for scanning a QR code 310 displayed on the shared device 130. The QR code 310 may contain an access code, which may include any number of characters arranged in any combination, which may be updated periodically or after each user session. Upon scanning the QR code 310, the user device 110 may extract the access code from the QR code 310 and display the extracted access code on the display thereof. The user 10 may then enter the displayed access code to the shared device 130, which may in turn compare the access code included in the QR code 310 and the access code entered by the user 10. Upon determining that these two access codes correspond to each other, the system 100 may confirm that the user 10 is physically proximate to the shared device 130. Alternatively, the user device 110 may transmit the extracted access code to the server 120 via a communication network (e.g., a Wi-Fi, mobile network, etc.). The server 120 may then determine whether the access code transmitted from the user device 110 corresponds to the access code included in the QR code 310 displayed at the shared device 130 to determine the user's proximity to the shared device 130.

Upon confirming the user's proximity to the shared device 130, the user 10 may provide, to the system 100, user authentication data, customized user session setting data, etc. For example, the user device 110 may include authentication data unique to the user 10, which may be cryptographically generated for enhanced security and conveniences. The user 10 may release the authentication data for authentication, which may be transmitted to the server 120 directly or via the shared device 130. This may avoid the user having to manually enter login information (e.g., login ID and password) to the shared device 130, which may lead to hacking or any other security breaches. Also, by using the cryptographically generated authentication data, the user 10 may be instantly authenticated locally at the shared device 130, which eliminates a need to transmit the user's login information from the shared to device 130 to the server 120, and compare, at the server 120, whether the login information matches user information stored at the server 120 to determine whether the user 10 is an authentication user or not. Upon authenticating the user 10, the server 120 or shared device 130 may provide a notification that the user 10 has been successfully authenticated by, for example, displaying a message on the shared device 130, sending a message to the user device 110, and/or the like.

Figure 4:
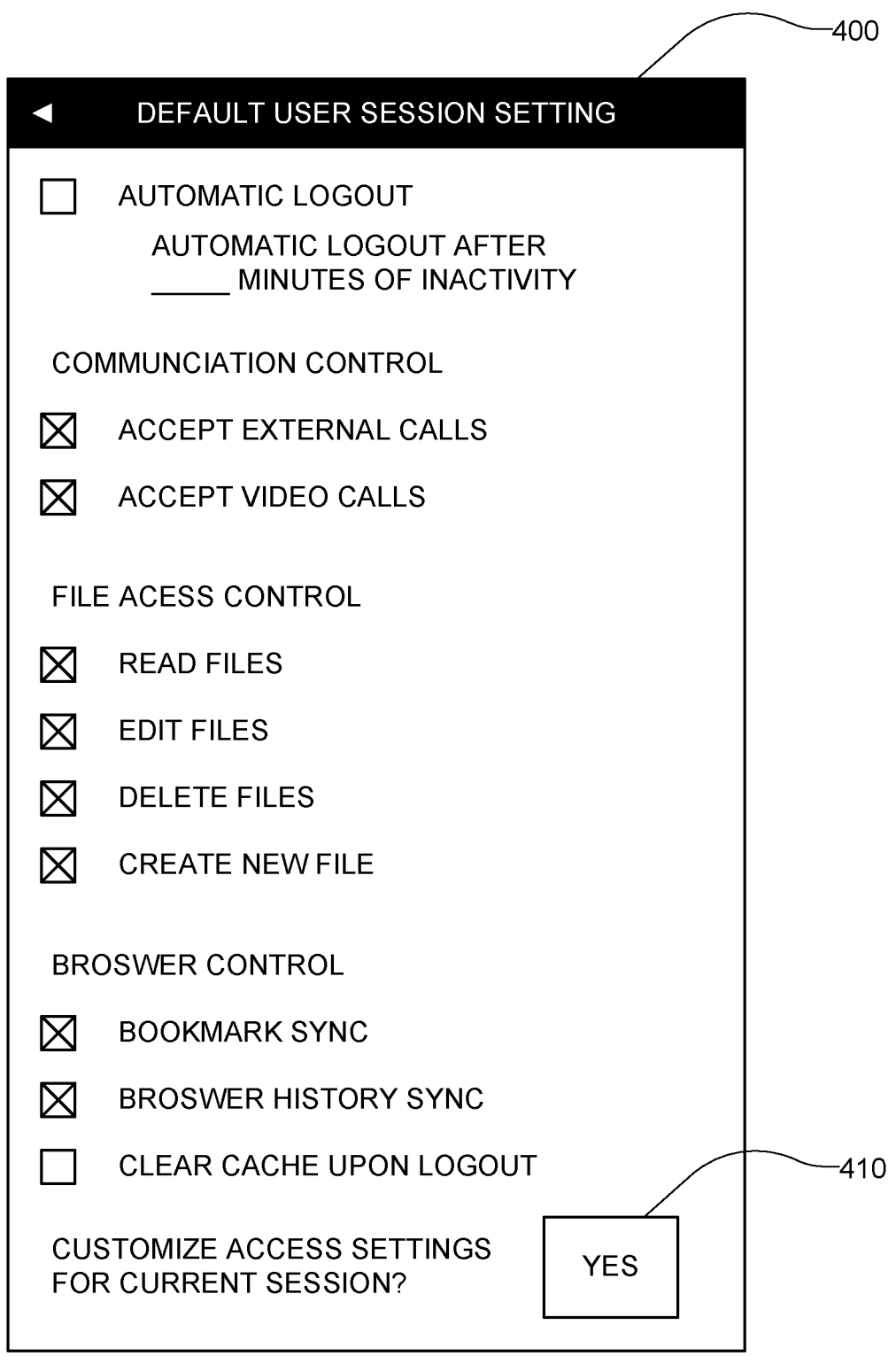
FIG. 4 illustrates another example GUI displayed on the user device for displaying a default user session setting for a user session conducted on the shared device.

The user 10 may then customize the default user session setting, which may occur prior to the system 100 initiate a new user session. For example, upon completing the user authentication, the server 120 may provide, to the user device 110, the default user session setting, which may be displayed at the user device 110. FIG. 4 illustrates an example GUI 400 rendered and displayed on the user device 110 for presenting the default user session setting associated with the user 10, which may be identical to the default user session setting shown in FIG. 2. The GUI 400 may provide an option to customize the default user session setting. For example, the GUI 400 may include a button 410 that allows the user 10 to modify or customize the default user session setting. When the user 10 activates the button 410, the user device 130 may display another GUI for customizing modifying the default user session setting, for example, an example GUI 500 shown in FIG. 5.

Figure 5:
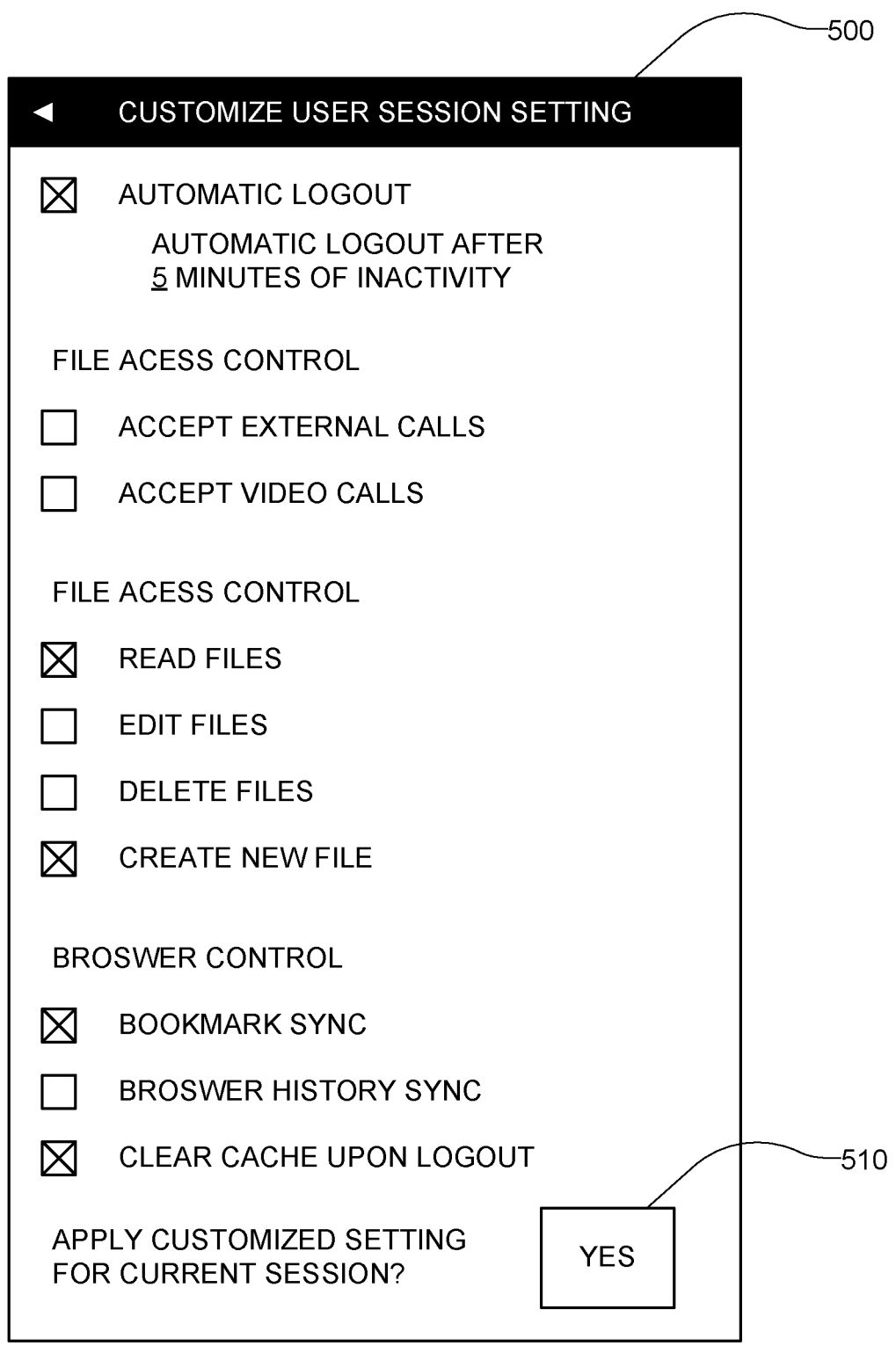
FIG. 5 illustrates another example GUI displayed on the user device for modifying the default user session setting.

Using the GUI 500, the user 10 may modify or customize the default user session setting to create a customized user session setting that is more restrictive than the default user session setting. For example, as shown in FIG. 5, the user 10 may activate the automatic logout setting such that a user that will conduct the user session at the shared device 130 is automatically logged out if a user inactivity is detected for, e.g., five minutes. Also, the user 10 may modify the file access control setting to deactivate external call or video calls that are not accepted during the user session. This may allow the user 10 to focus on tasks without being distracted by unwanted calls. The user 10 may modify the file access control setting only to allow read files available via the system 100 and create new files while prohibiting editing or deleting existing files. This may ensure that the accessible contents being compromised by unauthorized users. To further enhance the security, the user 10 may set the file access control setting to prohibit access to the files available via the system 100, which may include prohibiting reading such files available via the system 100. Using the GUI 500, the user 10 may modify the browser control setting such that the bookmark associated with the user 10 is synced with a browser installed at the shared device 130, which may help the user 10 to access necessary websites and network locations quickly. The user 10 may also turn off syncing the user's browser history and activate clearing the browser caches when the user session is completed and the user 10 is logged out from the shared device 130. Such functions may ensure that no browsing data remains in the shared device once the user 10 has been logged out from the shared device 130.

Once the default user session setting is modified and a customized user session setting is created, the user device 110 may provide, to the server 120 or shared device 130, customized user session setting data containing the customized user session setting. For example, the GUI 500 may include a button 510, which may apply the modification made to the default user session setting to the current user session. Upon detecting that the user 10 has activated the button 510, the user device 110 may generate customized user session setting data containing the customized user session setting, and transmit, to the server 120 or shared device 130 via the communication network 140, the customized user session setting data. Upon receiving the customized user session setting data, the server 120 may modify the default user session setting, generate a customized user session setting, apply the customized user session setting to the user session, and control the shared device 130 to initiate and conduct a new user session based on the customized user session setting.

The system 100 may be configured to allow the user 10 to customize the current user session setting at any time. For example, the user 10 may initiate, at the shared device 130, a user session with the default user session setting. The user 10 may then customize the default user session setting to be more restrictive when he or she must be temporarily away from the shared device 130 while the user session is being continued. When the user 10 comes back to the shared device 130, the user 10 may re-customize the current user session setting to be less restrictive or apply the default user session setting. As such, the system 100 may be configured to allow the user 10 to change the user session setting to be more or less restrictive whenever the user 10 finds necessary.

Upon creating and applying the customized user session setting to the user session implemented at the shared device 130, the system 100 may notify the user 10 that the user session has been implemented with the customized user session setting. For example, the server 120 may control the shared device 120 to display a message that the customized user session setting has been successfully applied to the user session. Alternatively, or additionally, the server 120 may send, to the user device 110 via the communication network 140, such message which may be displayed on the display of the user device 110.

Figure 6:
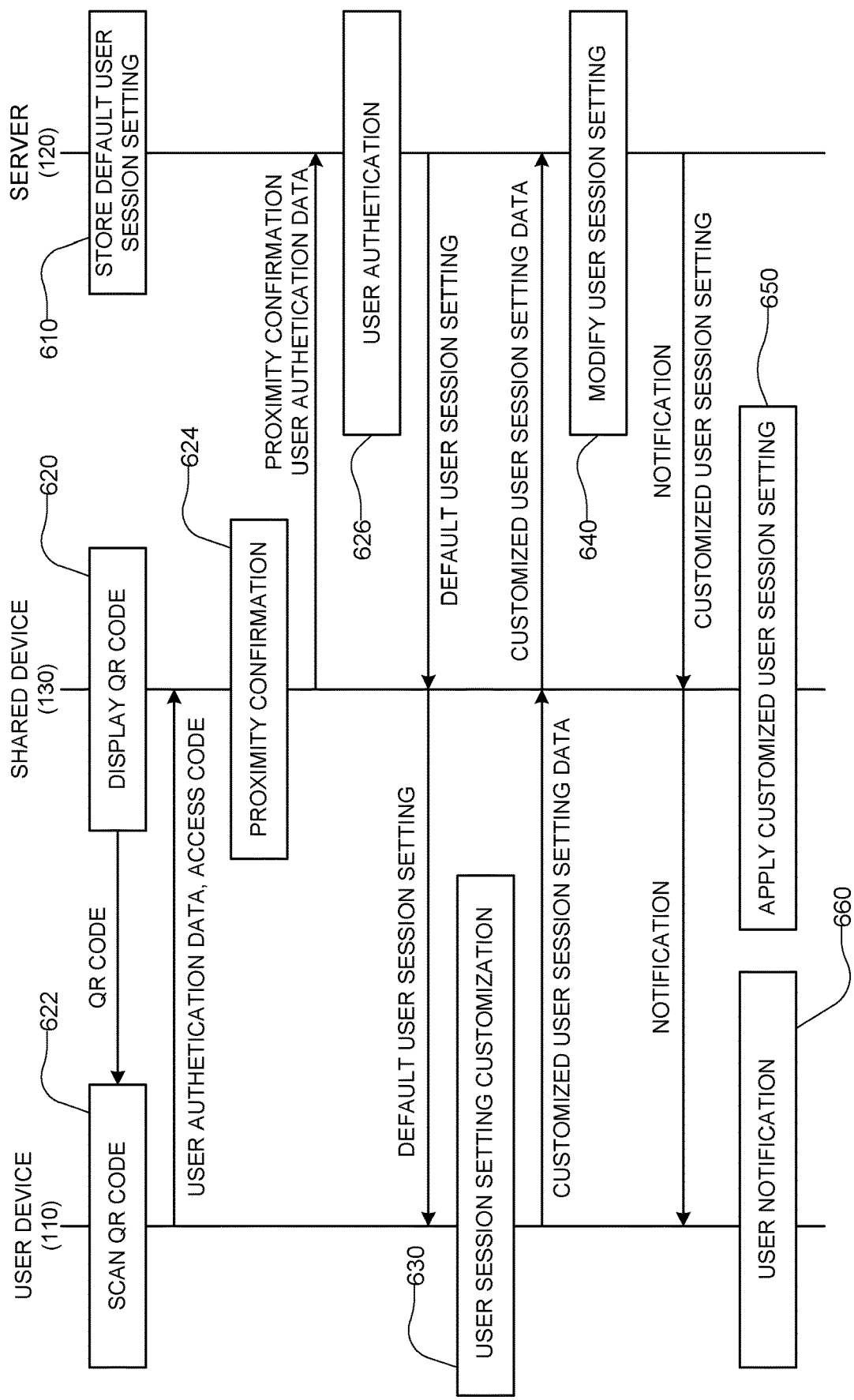
FIG. 6 illustrates a flow diagram showing operations by a user device, shared device and server for conducting a user session at a shared device and modifying a default user session setting for the user session.

FIG. 6 illustrates a flow diagram showing operations by the system 100, which may include the user device 110, server 120 and shared device 130, for conducting a user session at the shared device 130 and modifying the default user session setting for the user session at the shared device 130.

At step 610, the server 120 may store, at a storage device, the default user session setting associated with the user 10. At step 620, when the user 10 selects the shared device 130 for a user session, the shared device 130 may display the QR code 310 (shown in FIG. 3) on a display thereof. A step 622, the user device 110 may scan the QR code 310 displayed via the shared device 130, and transmit, to the server 120 or shared device 130, an access code included in the scanned QR code 310 along with user authentication data unique to the user 110. At step 624, the shared device 130 may confirm physical proximity of the user 10 to the shared device 130 based on a comparison between the access code included in the displayed QR code 310 and the access code transmitted from the user device 110. Upon confirming the user's proximity, the shared device 130 may send, to the server 120 via the network 140, the proximity confirmation along with the user authentication data received from the user device 110. Alternatively, the user device 110 may directly transmit, to the server 120 via the network 140, the user authentication data. At step 626, the server 120 may authenticate the user 10 based on the user authentication data provided by the user device 110. Upon authenticating the user 110 at step 626, the server 120 may provide the default user session setting to the user device 110 directly or via the shared device 130. The default user session setting may be displayed via, for example, the GUI 400 of the user device 110 shown in FIG. 4.

At step 630, the default user session setting may be modified and customized at the user device 110. For example, the user device 110 may render and display the GUI 500 shown in FIG. 5 to allow the user to customize the default user session setting and generate customized user session setting data. The user device 110 may then send the customized user session setting data to the server 120 directly or via the shared device 130. At step 640, upon receiving the customized user session setting data, the server 120 may modify the default user session setting based on the customized user session setting data received from the user device 110. The server 110 may then send, to the shared device 130, the customized user session setting. The server 110 may also send, to the user device 110 or shared device 130, a notification that the user 10 has been successfully authenticated and the default user session setting has been successfully customized based on the customized user session setting data. At step 650, the shared device 130 may apply the customized user session setting to the user session for the user 10. The shared device 130 may display a message based on the notification received from the server 120. At step 660, the user device 110 may generate, based on the notification from the server 120, a user notification that the user 10 has been successfully authenticated and the default user session setting has been successfully customized based on the customized user session setting data.

As such, it becomes possible to ensure that functions and contents accessible via a user session is restricted and protected from unauthorized accesses to and controls over the shared device 130, thereby providing technical solutions to the technical problem that a user session carried out using a shared device is vulnerable to unauthorized access to and control over the functions and contents available to the user 10 through the system 100.

Figure 7:
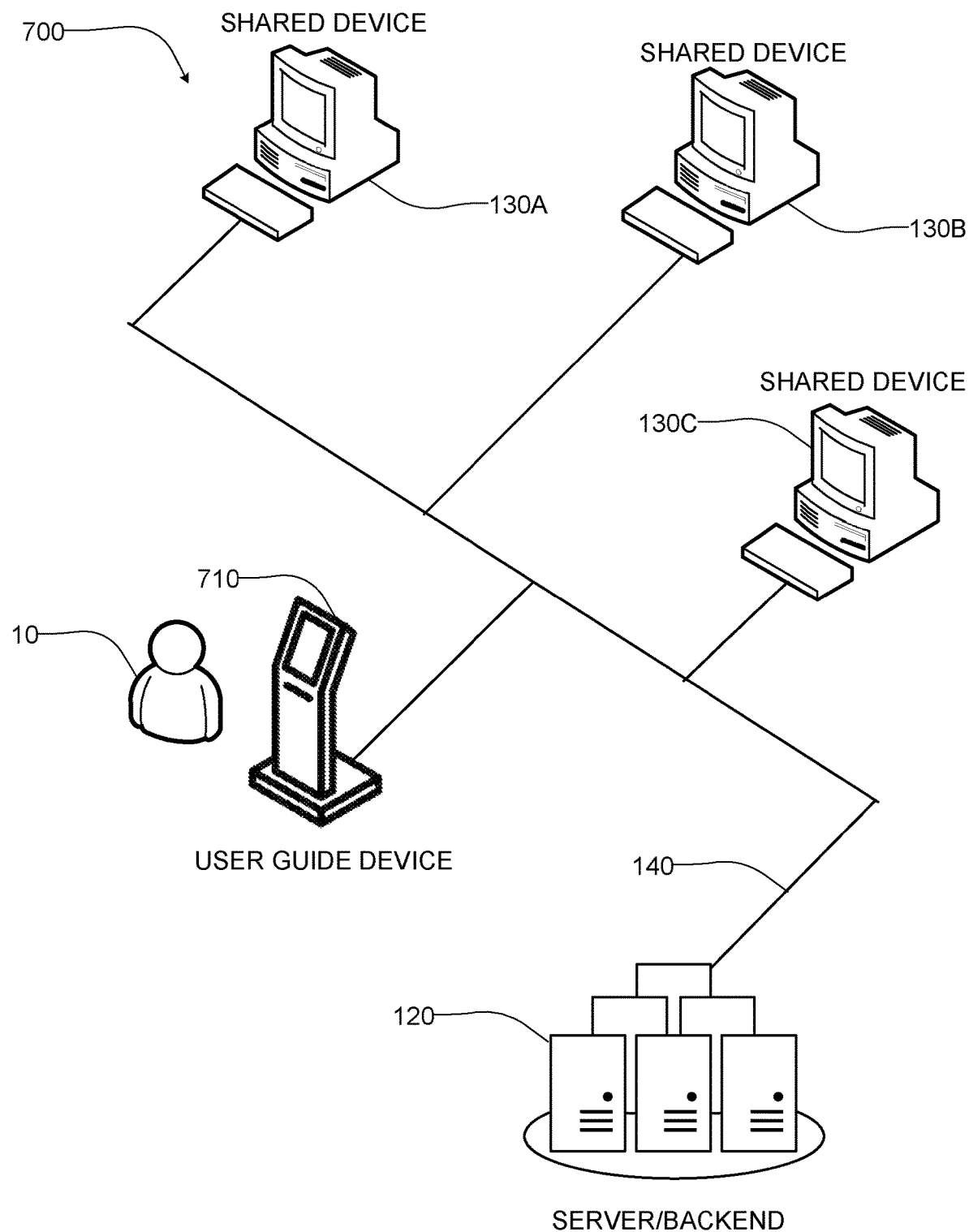
FIG. 7 illustrates an implementation of another system comprising a user guide device for guiding a user to find an available shared device for a user session and modify a user session setting for the user session.

FIG. 7 illustrates another example of a system 700 for allowing a user to customize and modify a user session setting without using the user device 110 (e.g., mobile phone, etc.) associated with the user 10. The system 700 may include a user guide device 710 configured to guide the user 10 to select one of a plurality of shared devices, such as, shared devices 130A, 130B, 130C, etc. (hereinafter "shared devices 130") for a user session, and to customize the default user session setting associated with the user 10 and create customized user session setting data. For example, the user guide device 710 may be a kiosk or a similar computing device equipped with a user interface device to interact with the user 10. The user guide device 710 may be in communication with the server 120 and shared devices 130 via the network 140.

The user guide device 710 may have access to usage status of the shared devices 130. For example, the server 120 may keep a record of whether each shared device 130 is being used for a user session, and the user guide device have access to such record maintained by the server 120. When the user 10 approaches and interacts with the user guide device 710, the user guide device 710 may provide a list of the shared devices 130 that are available for the user's selection for a user session. The user guide device 710 may also be configured to receive the user authentication data from the user 10. For example, the user guide device 710 may be equipped with a fingerprint sensor, ID card scanner, etc. Alternatively, the user guide device 710 may be configured to receive cryptographically generated user authentication data from the user device 110.

Upon authenticating the user 10, the user guide device 710 may provide the user 110 with an option to modify or customize the user's default user session setting. For example, the user guide device 710 may receive, from the server 120, the default user session setting and display a GUI configured to allow the user to modify default user session setting. Such GUI may be similar to the GUI 500 shown in FIG. 5. Upon receiving the user's input modifying the default user session setting via the GUI, the user guide device 710 may generate and transmit customized user session setting data to the server 120 along with user selection data indicating which one of the shared devices 130 has been selected by the user 10 for the user session. In turn, the server 120 may modify the default user session setting, send the customized user session setting to the selected shared device 130, and control the selected shared device 130 to apply the customized user session setting when conducting the user session for the user 10. Hence, when the user 10 completes interacting with the user guide device 710 and walks to the selected shared device 130, the selected shared device 130 may be immediately ready to conduct the user session based on the customized user session setting. This may eliminate a need for the user 10 to look for any available shared device and manually customize the user session setting after finding an available shared device, which may be time consuming and stressful.

Figure 8:
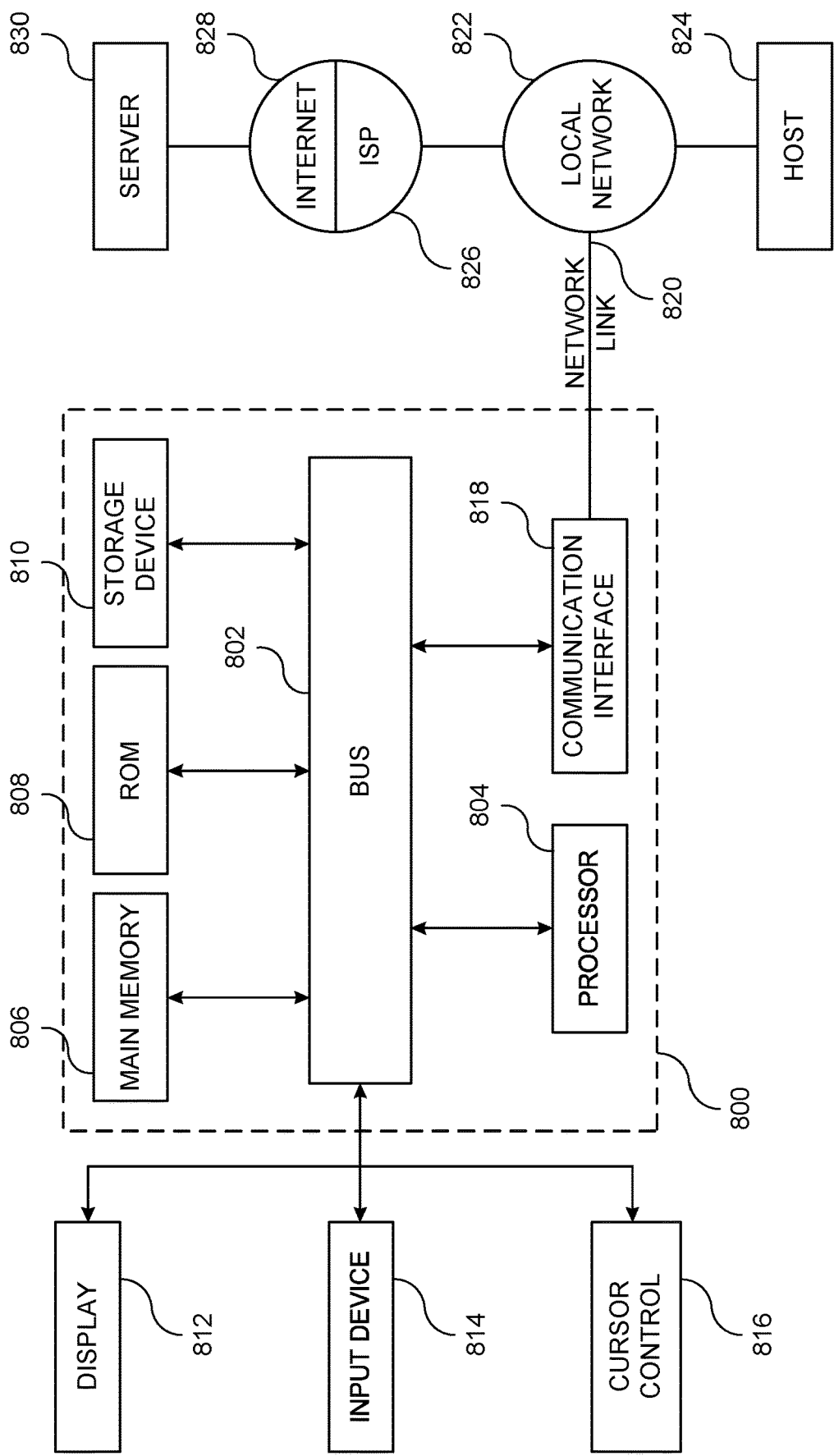
FIG. 8 is a block diagram showing an example computer system upon which aspects of this disclosure may be implemented.

FIG. 8 is a block diagram showing an example a computer system 800 upon which aspects of this disclosure may be implemented. The computer system 800 may include a bus 802 or other communication mechanism for communicating information, and a processor 804 coupled with the bus 802 for processing information. The computer system 800 may also include a main memory 806, such as a random-access memory (RAM) or other dynamic storage device, coupled to the bus 802 for storing information and instructions to be executed by the processor 804. The main memory 806 may also be used for storing temporary variables or other intermediate information during execution of instructions to be executed by the processor 804. The computer system 800 may implement, for example, the user device 110, server 129, shared devices 130 and user guide device 710.

The computer system 800 may further include a read only memory (ROM) 808 or other static storage device coupled to the bus 802 for storing static information and instructions for the processor 804. A storage device 810, such as a flash or other non-volatile memory may be coupled to the bus 802 for storing information and instructions.

The computer system 800 may be coupled via the bus 802 to a display 812, such as a liquid crystal display (LCD), for displaying information. One or more user input devices, such as the example user input device 814 may be coupled to the bus 802, and may be configured for receiving various user inputs, such as user command selections and communicating these to the processor 804, or to the main memory 806. The user input device 814 may include physical structure, or virtual implementation, or both, providing user input modes or options, for controlling, for example, a cursor, visible to a user through display 812 or through other techniques, and such modes or operations may include, for example virtual mouse, trackball, or cursor direction keys.

The computer system 800 may include respective resources of the processor 804 executing, in an overlapping or interleaved manner, respective program instructions. Instructions may be read into the main memory 806 from another machine-readable medium, such as the storage device 810. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such as storage device 810. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine.

The computer system 800 may also include a communication interface 818 coupled to the bus 802, for two-way data communication coupling to a network link 820 connected to a local network 822. The network link 820 may provide data communication through one or more networks to other data devices. For example, the network link 820 may provide a connection through the local network 822 to a host computer 824 or to data equipment operated by an Internet Service Provider (ISP) 826 to access through the Internet 828 a server 830, for example, to obtain code for an application program.

In the following, further features, characteristics and advantages of the invention will be described by means of items:

Item 1. A system comprising a first device associated with a user; a second device configured to establish a user session; and a server in communication with the second device and configured to control the second device to establish the user session, wherein at least one of the first device, the second device and the server includes a processor and a computer-readable medium in communication with the processor and storing instructions that, when executed by the processor, cause the system to perform: storing, at a data storage, a default user session setting associated with the user, the default user session setting defining a default user access privilege to functionality or content available via the system; receiving a first user input selecting the second device for establishing the user session; determining that the first device is proximate to the second device; authenticating the user based on authentication data provided from the first device; receiving a second user input requesting to modify the default user session setting, the second user input including modification data defining a restrictive modification to the default user session setting; modifying, at the server, the default user session setting based on the modification data to create a customized user session setting defining a customized user access privilege to the functionality or content available via the system, wherein the customized user access privilege is more restrictive than the default user access privilege; establishing, at the second device, the customized user session for the user based on the customized user setting received from the server; and notifying the user that the customized user session has been established at the second device.

Item 2. The system of Item 1, wherein, for receiving the first or second user input, the instructions, when executed by the processor, further cause the system to perform receiving the first or second user input via a user interface of the first device.

Item 3. The system of Item 2, wherein the instructions, when executed by the processor, further cause the system to perform transmitting, from the first device to the server, the first or second user input.

Item 4. The system of Item 3, wherein the instructions, when executed by the processor, further cause the system to perform transmitting, from the first device to the server via the second device, the first or second user input.

Item 5. The system of Item 1, wherein the first device comprises a mobile device associated with the user.

Item 6. The system of Item 5, wherein, for determining that the first device is proximate to the second device, the instructions, when executed by the processor, further cause the system to perform: displaying, at the second device, a QR code containing a first access code; receiving, from the mobile device, a second access code; and determining that the second access code corresponds to the first access code.

Item 7. Item The system of Item 1, wherein the first device comprises a kiosk.

Item 8. The system of Item 1, wherein the instructions, when executed by the processor, further cause the system to perform rendering, at the first device, a user interface configured to show the default user session setting and receive the second user input.

Item 9. The system of Item 1, wherein the customized user session setting defines at least one of: whether the user is allowed to edit or delete a file during the user session; whether the user is allowed to make or receive a call or message during the user session; and whether to sync a browser bookmark or history associated with the user for the user session.

Item 10. A non-transitory computer-readable medium comprising instructions that, when executed by a processor, cause the processor to control a system to perform functions, the system including (1) a first device associated with a user, (2) a second device configured to establish a user session, and (3) a server in communication with the second device and configured to control the second device to establish the user session, the functions performed by the system comprising: storing, at a data storage, a default user session setting associated with the user, the default user session setting defining a default user access privilege to functionality or content available via the system; receiving a first user input selecting the second device for establishing the user session; determining that the first device is proximate to the second device; authenticating the user based on authentication data provided from the first device; receiving a second user input requesting to modify the default user session setting, the second user input including modification data defining a restrictive modification to the default user session setting; modifying, at the server, the default user session setting based on the modification data to create a customized user session setting defining a customized user access privilege to the functionality or content available via the system, wherein the customized user access privilege is more restrictive than the default user access privilege; establishing, at the second device, the customized user session for the user based on the customized user setting received from the server; and notifying the user that the customized user session has been established at the second device.

Item 11. A method performed by a system including (1) a first device associated with a user, (2) a second device configured to establish a user session, and (3) a server in communication with the second device and configured to control the second device to establish the user session, the method comprising: storing, at a data storage, a default user session setting associated with the user, the default user session setting defining a default user access privilege to functionality or content available via the system; receiving a first user input selecting the second device for establishing the user session; determining that the first device is proximate to the second device; authenticating the user based on authentication data provided from the first device; receiving a second user input requesting to modify the default user session setting, the second user input including modification data defining a restrictive modification to the default user session setting; modifying, at the server, the default user session setting based on the modification data to create a customized user session setting defining a customized user access privilege to the functionality or content available via the system, wherein the customized user access privilege is more restrictive than the default user access privilege; establishing, at the second device, the customized user session for the user based on the customized user setting received from the server; and notifying the user that the customized user session has been established at the second device.

Item 12. The method of Item 11, wherein receiving the first or second user input comprises receiving the first or second user input via a user interface of the first device.

Item 13. The method of Item 12, further comprising transmitting, from the first device to the server, the first or second user input.

Item 14. The method of Item 13, further comprising transmitting, from the first device to the server via the second device, the first or second user input.

Item 15. The method of Item 11, wherein the first user device comprises a mobile device associated with the user.

Item 16. The method of Item 15, wherein determining that the first device is proximate to the second device comprises: displaying, at the second device, a QR code containing a first access code; receiving, from the mobile device, a second access code; and determining that the second access code corresponds to the first access code.

Item 17. The method of Item 11, wherein the first user device comprises a kiosk.

Item 18. The method of Item 11, further comprises rendering, at the first device, a user interface configured to display the default user session setting and receive the second user input.

Item 19. The method of Item 11, wherein the customized user session setting defines at least one of: whether the user is allowed to edit or delete a file during the user session; whether the user is allowed to make or receive a call or message during the user session; and whether to sync a browser bookmark or history associated with the user for the user session.

Item 20. The method of Item 11, wherein the customized user session setting includes an automatic logout setting.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system comprising:
   a first device associated with a user;
   a second device configured to establish a user session; and
   a server in communication with the second device and configured to control the second device to establish the user session,
   wherein at least one of the first device, the second device and the server includes a processor and a computer-readable medium in communication with the processor and storing instructions that, when executed by the processor, cause the system to perform:
   storing, at a data storage, a default user session setting associated with the user, the default user session setting defining a default user access privilege to functionality or content available via the system;
   receiving a first user input selecting the second device for establishing the user session;
   determining that the first device is proximate to the second device;
   authenticating the user based on authentication data provided from the first device;
   receiving a second user input requesting to modify the default user session setting, the second user input including modification data defining a restrictive modification to the default user session setting;
   modifying, at the server, the default user session setting based on the modification data to create a customized user session setting defining a customized user access privilege to the functionality or content available via the system, wherein the customized user access privilege is more restrictive than the default user access privilege;
   establishing, at the second device, the customized user session for the user based on the customized user setting received from the server; and
   notifying the user that the customized user session has been established at the second device.

2. The system of claim 1, wherein, for receiving the first or second user input, the instructions, when executed by the processor, further cause the system to perform receiving the first or second user input via a user interface of the first device.

3. The system of claim 2, wherein the instructions, when executed by the processor, further cause the system to perform transmitting, from the first device to the server, the first or second user input.

4. The system of claim 3, wherein the instructions, when executed by the processor, further cause the system to perform transmitting, from the first device to the server via the second device, the first or second user input.

5. The system of claim 1, wherein the first device comprises a mobile device associated with the user.

6. The system of claim 5, wherein, for determining that the first device is proximate to the second device, the instructions, when executed by the processor, further cause the system to perform:
   displaying, at the second device, a QR code containing a first access code;
   receiving, from the mobile device, a second access code; and
   determining that the second access code corresponds to the first access code.

7. The system of claim 1, wherein the first device comprises a kiosk.

8. The system of claim 1, wherein the instructions, when executed by the processor, further cause the system to perform rendering, at the first device, a user interface configured to show the default user session setting and receive the second user input.

9. The system of claim 1, wherein the customized user session setting defines at least one of:
   whether the user is allowed to edit or delete a file during the user session;
   whether the user is allowed to make or receive a call or message during the user session; and
   whether to sync a browser bookmark or history associated with the user for the user session.

10. A non-transitory computer-readable medium comprising instructions that, when executed by a processor, cause the processor to control a system to perform functions, the system including (1) a first device associated with a user, (2) a second device configured to establish a user session, and (3) a server in communication with the second device and configured to control the second device to establish the user session, the functions performed by the system comprising:
    storing, at a data storage, a default user session setting associated with the user, the default user session setting defining a default user access privilege to functionality or content available via the system;
    receiving a first user input selecting the second device for establishing the user session;
    determining that the first device is proximate to the second device;
    authenticating the user based on authentication data provided from the first device;
    receiving a second user input requesting to modify the default user session setting, the second user input including modification data defining a restrictive modification to the default user session setting;
    modifying, at the server, the default user session setting based on the modification data to create a customized user session setting defining a customized user access privilege to the functionality or content available via the system, wherein the customized user access privilege is more restrictive than the default user access privilege;
    establishing, at the second device, the customized user session for the user based on the customized user setting received from the server; and notifying the user that the customized user session has been established at the second device.

11. A method performed by a system including (1) a first device associated with a user, (2) a second device configured to establish a user session, and (3) a server in communication with the second device and configured to control the second device to establish the user session, the method comprising:

storing, at a data storage, a default user session setting associated with the user, the default user session setting defining a default user access privilege to functionality or content available via the system;

receiving a first user input selecting the second device for establishing the user session;

determining that the first device is proximate to the second device;

authenticating the user based on authentication data provided from the first device;

receiving a second user input requesting to modify the default user session setting, the second user input including modification data defining a restrictive modification to the default user session setting;

modifying, at the server, the default user session setting based on the modification data to create a customized user session setting defining a customized user access privilege to the functionality or content available via the system, wherein the customized user access privilege is more restrictive than the default user access privilege;

establishing, at the second device, the customized user session for the user based on the customized user setting received from the server; and notifying the user that the customized user session has been established at the second device.

12. The method of claim 11, wherein receiving the first or second user input comprises receiving the first or second user input via a user interface of the first device.

13. The method of claim 12, further comprising transmitting, from the first device to the server, the first or second user input.

14. The method of claim 13, further comprising transmitting, from the first device to the server via the second device, the first or second user input.

15. The method of claim 11, wherein the first user device comprises a mobile device associated with the user.

16. The method of claim 15, wherein determining that the first device is proximate to the second device comprises:

displaying, at the second device, a QR code containing a first access code;

receiving, from the mobile device, a second access code; and determining that the second access code corresponds to the first access code.

17. The method of claim 11, wherein the first user device comprises a kiosk.

18. The method of claim 11, further comprises rendering, at the first device, a user interface configured to display the default user session setting and receive the second user input.

19. The method of claim 11, wherein the customized user session setting defines at least one of:

whether the user is allowed to edit or delete a file during the user session;

whether the user is allowed to make or receive a call or message during the user session; and whether to sync a browser bookmark or history associated with the user for the user session.

20. The method of claim 11, wherein the customized user session setting includes an automatic logout setting.

\* \* \* \* \*